United States Patent
Yamada et al.

(10) Patent No.: US 9,115,811 B2
(45) Date of Patent: Aug. 25, 2015

(54) FLOW CONTROL DEVICE

(75) Inventors: Hirosuke Yamada, Tsukubamirai (JP);
Sanae Nakamura, Toride (JP); Akira Kuribayashi, Meguro-ku (JP)

(73) Assignee: SMC KABUSHIKI KAISHA, Tokyo (JP)

( * ) Notice: Subject to any disclaimer, the term of this patent is extended or adjusted under 35 U.S.C. 154(b) by 309 days.

(21) Appl. No.: 13/520,624

(22) PCT Filed: May 20, 2010

(86) PCT No.: PCT/JP2010/058541
§ 371 (c)(1),
(2), (4) Date: Jul. 5, 2012

(87) PCT Pub. No.: WO2011/089737
PCT Pub. Date: Jul. 28, 2011

(65) Prior Publication Data
US 2012/0273074 A1    Nov. 1, 2012

(30) Foreign Application Priority Data

Jan. 21, 2010   (JP) .................................. 2010-011174

(51) Int. Cl.
*F16K 1/04* (2006.01)
*F16K 1/00* (2006.01)

(52) U.S. Cl.
CPC ... *F16K 1/00* (2013.01); *F16K 1/04* (2013.01); *Y10T 137/87925* (2015.04); *Y10T 137/88054* (2015.04)

(58) Field of Classification Search
CPC ..... F16K 15/148; F16K 15/18; F16K 15/188; F16K 47/10; F16K 47/16
USPC ............... 137/493.7, 512.15, 513.3, 599.17, 137/599.18, 601.18, 601.19, 601.2, 601.21, 137/854; 251/96, 117, 122, 210
See application file for complete search history.

(56) References Cited

U.S. PATENT DOCUMENTS 3,893,477 A * 7/1975 Stoll et al. .................. 137/614.2
4,619,287 A * 10/1986 Hama et al. ................ 137/513.3
(Continued)

FOREIGN PATENT DOCUMENTS

CN    2292190 Y    9/1998
CN    2823701 Y    10/2006
(Continued)

OTHER PUBLICATIONS

International Search Report Issued Jun. 15, 2010 in PCT/JP10/58541 Filed May 20, 2010.
(Continued)

*Primary Examiner* — Matthew W Jellett
(74) *Attorney, Agent, or Firm* — Oblon, McClelland, Maier & Neustadt, L.L.P.

(57) ABSTRACT

A flow control device is provided with a first body having a first port through which pressure fluid is supplied, and a second body which is installed on the first body. A valve mechanism which controls the circulation state of the pressure fluid that circulates from the first port to a second port is provided inside this first body. Furthermore, a first connecting section of the first body is inserted into and engaged with the inside of a second connecting section formed at the upper end of the second body, resulting in the first body and the second body being integrally connected together.

14 Claims, 12 Drawing Sheets

(56) References Cited

U.S. PATENT DOCUMENTS

| | | | | |
|---|---|---|---|---|
| 5,081,904 | A * | 1/1992 | Horn et al. | 91/420 |
| 5,305,777 | A * | 4/1994 | Nakamura et al. | 137/102 |
| 6,131,610 | A * | 10/2000 | Morisako et al. | 137/601.19 |
| 6,227,231 | B1 * | 5/2001 | Hosono et al. | 137/269.5 |
| 6,296,013 | B1 * | 10/2001 | Hosono et al. | 137/493.7 |
| 6,296,015 | B1 * | 10/2001 | Morisako et al. | 137/601.19 |
| 6,745,789 | B2 * | 6/2004 | Christiani et al. | 137/102 |
| 6,883,777 | B2 * | 4/2005 | Smith | 251/118 |
| 2011/0309284 | A1 * | 12/2011 | Yamada et al. | 251/324 |

FOREIGN PATENT DOCUMENTS

| | | |
|---|---|---|
| JP | 59-15875 U | 1/1984 |
| JP | 3-115279 U | 11/1991 |
| JP | 4-73669 U | 6/1992 |
| JP | 4 95180 | 8/1992 |
| JP | 10-103560 A | 4/1998 |
| JP | 11 63271 | 3/1999 |
| JP | 2001-141090 A | 5/2001 |
| JP | 2001-153244 A | 6/2001 |
| JP | 2001 173835 | 6/2001 |
| JP | 2006-153160 A | 6/2006 |

OTHER PUBLICATIONS

Notice of Allowance issued Feb. 5, 2013 in Japanese Patent Application No. 2010-011174 (with partial English-language translation).
Combined Chinese Office Action and Search Report issued Jun. 20, 2013 in Patent Application No. 201080062051.7 with English Translation.

* cited by examiner

FLOW CONTROL DEVICE

TECHNICAL FIELD

The present invention relates to a flow control device, which is capable of controlling the flow rate of a fluid that flows between a pair of ports, by displacement of a rod having a valve member thereon along an axial direction.

BACKGROUND ART

As shown in Japanese Laid-Open Utility Model Publication No. 04-095180, the present inventors have proposed a flow control device, which is connected via piping to a fluid pressure device such as a cylinder or the like, and which is capable of controlling operation of the fluid pressure device by adjusting the flow rate of a fluid that is supplied to and discharged from the fluid pressure device.

SUMMARY OF THE INVENTION

A general object of the present invention is to provide a flow control device, which can be made smaller in size while reducing the number of component parts and improving ease of assembly thereof.

The present invention is characterized by a flow control device, which is capable of controlling the flow rate of a fluid that flows between a pair of a first port and a second port by displacement of a rod having a valve member thereon in an axial direction, comprising:

a first body including a coupling having the first port and to which a tube is connected for supplying or discharging the fluid, a guide member for guiding the rod along the axial direction, and a seat on which the valve member can be seated, and a second body disposed on a lower part of the first body and having the second port to which the fluid is supplied or from which the fluid is discharged, wherein a holder, which retains a check valve that abuts against an inner circumferential surface of the second body, is formed on an outer circumferential surface of the first body, a fluid passage that communicates with the first port and through which the fluid flows is formed between the first body and the second body, and a first connecting member, which is disposed on an outer peripheral end of the first body, is connected to a second connecting member disposed on an end of the second body.

DESCRIPTION OF THE EMBODIMENTS

Figure 1:
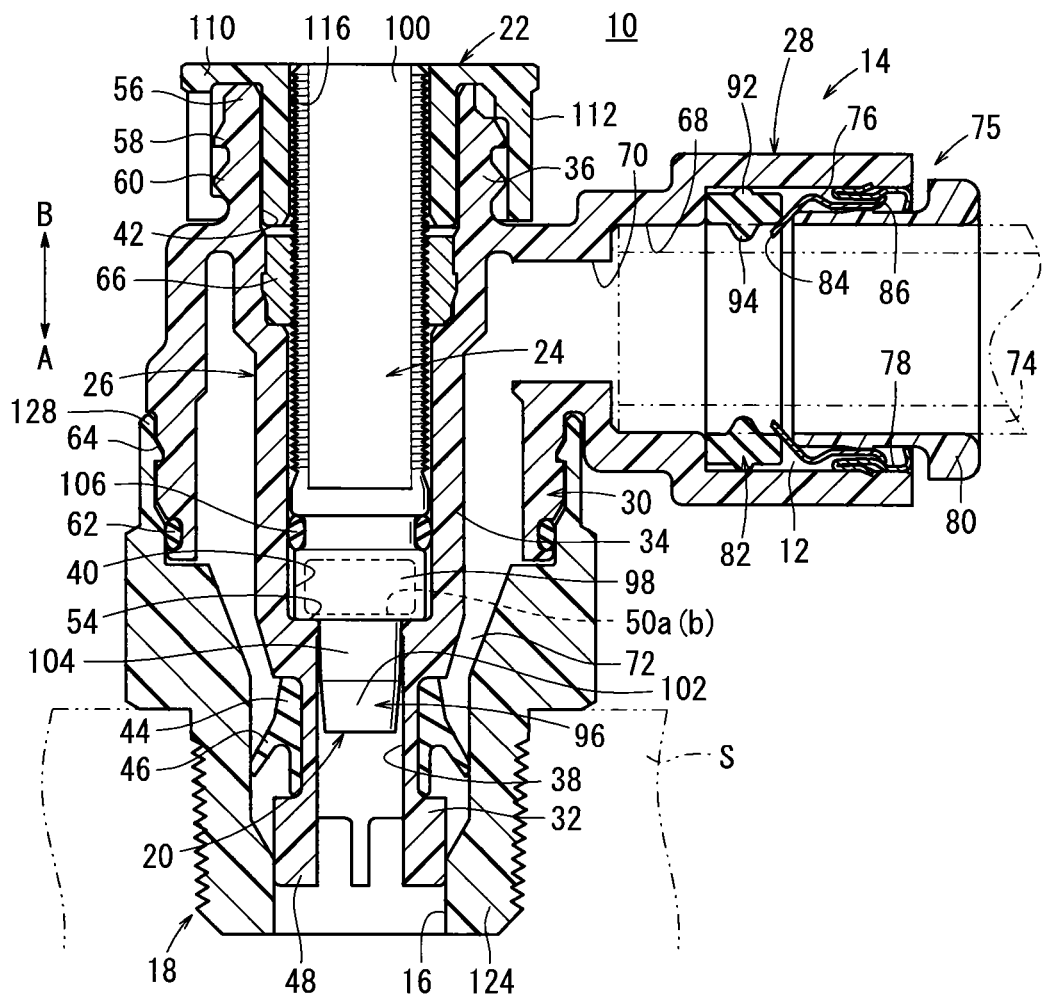
FIG. 1 is an overall cross sectional view of a flow control device according to a first embodiment of the present invention.

In FIG. 1, reference numeral 10 indicates a flow control device according to a first embodiment of the present invention.

Figure 2:
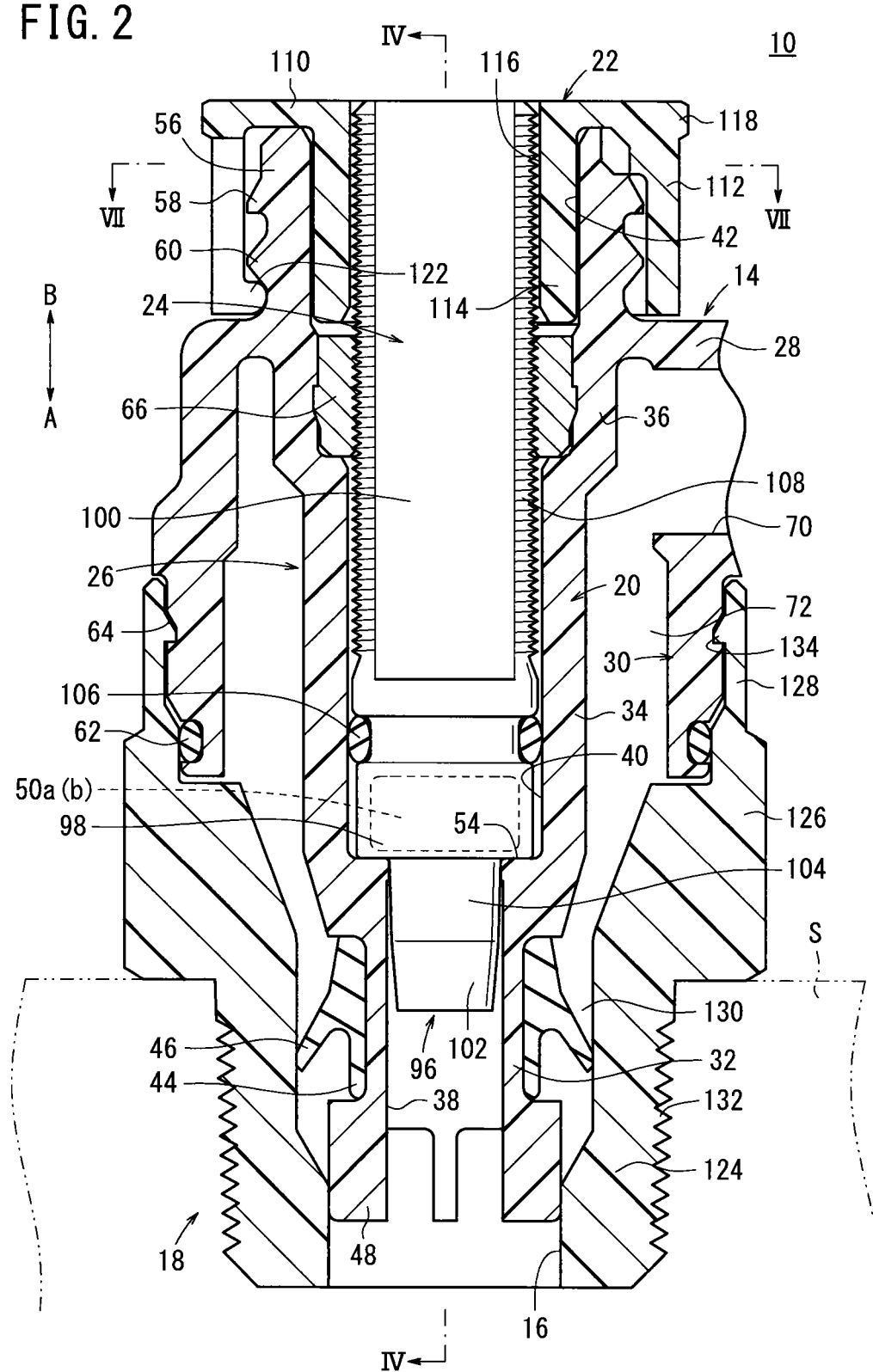
FIG. 2 is an enlarged cross sectional view showing a second body and a portion of a first body in the flow control device of FIG. 1.

As shown in FIGS. 1 through 4, the flow control device 10 includes a first body 14 having a first port 12 to which a pressure fluid is supplied, and a second body 18 having a second port 16 from which the pressure fluid is discharged, the second body 18 being assembled with respect to the first body 14, a valve mechanism 20 that controls a flow state of the pressure fluid (e.g., pressurized air) that flows from the first port 12 to the second port 16, and a handle (operating element) 22 for manually controlling the flow rate of the pressure fluid by the valve mechanism 20. FIGS. 1 and 2 illustrate a valve closed condition in which communication between the first port 12 and the second port 16 is blocked by a needle valve (rod) 24 that constitutes the valve mechanism 20.

Further, the first and second bodies 14, 18, for example, are formed from a resin material.

The first body 14 is constituted from a main body portion 26 formed, for example, from a resin material, and which is cylindrical in shape extending a predetermined length along an axial direction (the direction of arrows A and B), a connector (coupling) 28 connected to a side of the main body portion 26 and having the first port 12 in the interior thereof, and a first connecting member (second fitting member) 30 formed on an outer circumferential side of the main body portion 26 and which is connected to the second body 18.

The main body portion 26 is made up from a first tubular section 32 formed at a downward end thereof, a second tubular section (guide member) 34, which is connected to an upper part of the first tubular section 32 and expanded in diameter with respect to the first tubular section 32, and a third tubular section 36 connected to an upper part of the second tubular section 34 and expanded in diameter with respect to the second tubular section 34. In addition, in the interiors of the first through third tubular sections 32, 34, 36, first through third through holes 38, 40, 42 are formed therein respectively. The first through third tubular sections 32, 34, 36 are formed such that the outer circumferences thereof become greater stepwise from the first tubular section 32 to the third tubular section 36. Similarly, the first through third through holes 38, 40, 42 are formed such that the inner diameters thereof become larger stepwise corresponding to the first through third tubular sections 32, 34, 36, in order sequentially from the first through hole 38, the second through hole 40, and the third through hole 42.

An annular check valve 44 is mounted via an annular groove on an outer circumferential surface of the first tubular section 32, the check valve 44 abutting against an inner wall surface of the second body 18 in which the first tubular section 32 is inserted. The check valve 44 is formed, for example, from an elastic material such as rubber or the like, and is substantially V-shaped in cross section opening in a downward direction. A flange portion 46, which projects obliquely in a radial outward direction from the outer circumferential surface of the check valve 44, abuts against the second body 18. That is, the first tubular section 32 functions as a holder for holding the check valve 44.

Further, a plurality of fins (first fitting member) 48 are provided on a lower end of the first tubular section 32, which are separated at equal intervals along the circumferential direction, each of the fins 48 being formed with a predetermined width in a radial inward direction with respect to an outer circumferential surface of the first tubular section 32, and extending downwardly (in the direction of the arrow A) by a predetermined length.

In addition, the fins 48 that make up the first tubular section 32 are in sliding contact with the inner circumferential wall of the second port 16, whereby the main body portion 26 of the first body 14 including the first tubular section 32 is positioned coaxially with the second body 18. More specifically, the fins 48 function as a positioning means for arranging and positioning the main body portion 26 of the first body 14 coaxially with respect to the second body 18.

Further, the fins 48 also include a rectifying function for rectifying the flow of a fluid that is supplied to the second port 16 and flows downstream therefrom.

On the other hand, the first through hole 38 penetrates along the axial direction (in the direction of arrows A and B) at a substantially constant diameter. A portion of a needle valve 24 of the valve mechanism 20, to be described later, is inserted through the first through hole 38.

The second tubular section 34 is formed at a substantially central portion along the axial direction (in the direction of arrows A and B) of the main body portion 26, with the needle valve 24 (described later) constituting the valve mechanism 20 being inserted for displacement through the second through hole 40 in the interior of the second tubular section 34. A pair of communication holes 50a, 50b are formed in the second tubular section 34 so as to penetrate therethrough substantially perpendicular to the axis thereof, the communication holes 50a, 50b establishing communication between the exterior of the second tubular section 34 and the second through hole 40.

The communication holes 50a, 50b each have an opening with a substantially rectangular shape in cross section, and are formed on a straight line perpendicularly to the axis of the second tubular section 34 with the axis thereof as a centerline of the opening. The position of the communication holes 50a, 50b is such that the communication holes 50a, 50b are formed downwardly (in the direction of the arrow A) from the lower end of a later-described first connecting member 30.

Figure 5:
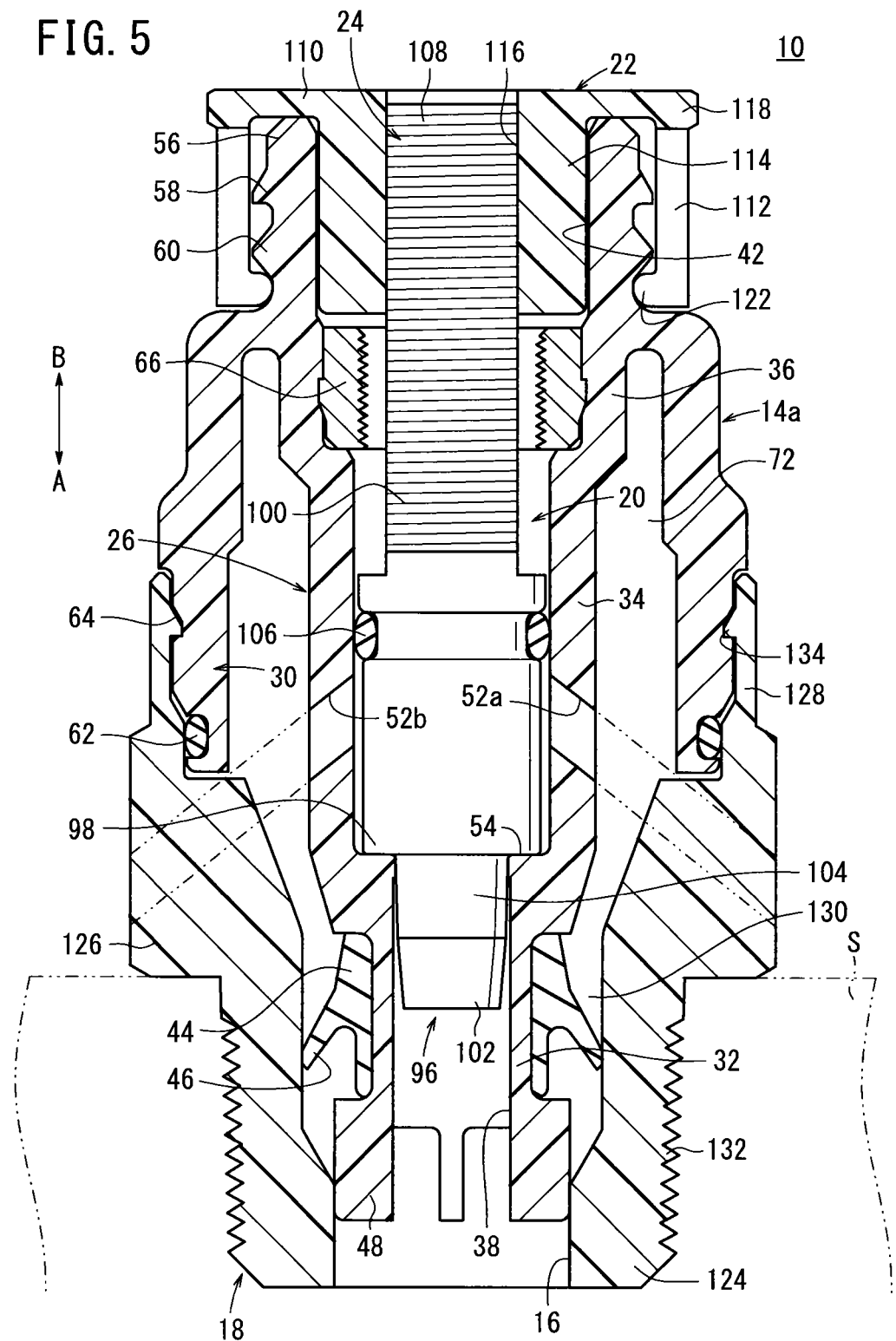
FIG. 5 is an overall cross sectional view of a flow control device according to a modified example.

The communication holes 50a, 50b are not limited to a case of being formed in the second tubular section 34 so as to penetrate substantially horizontally in the radial direction. For example, communication holes 52a, 52b may be formed in the first body 14a as shown in FIG. 5 so as to be inclined downwardly at a predetermined angle toward the outer circumferential side. In this case as well, the position of the communication holes 52a, 52b is such that the communication holes 52a, 52b are formed downwardly (in the direction of the arrow A) from a lower end of the first connecting member 30.

Further, on a lower part of the second tubular section 34, at a position bordering with the first tubular section 32, a seat 54 is formed, which enables the needle valve 24 constituting the valve mechanism 20 to be seated thereon. The seat 54 is formed in a planar shape connecting the inner circumferential surface of the first tubular section 32 and the inner circumferential surface of the second tubular section 34, and is formed perpendicularly to the axis of the main body portion 26.

The first connecting member 30, which extends downwardly (in the direction of the arrow A) after being expanded in diameter in a radial outward direction from a substantially central portion along the axial direction (in the direction of the arrow A, B) of the third tubular section 36, is connected to the third tubular section 36, and the connector 28 is joined thereto at substantially the same height as the location where the first connecting member 30 is connected to the third tubular section 36.

Figure 7:
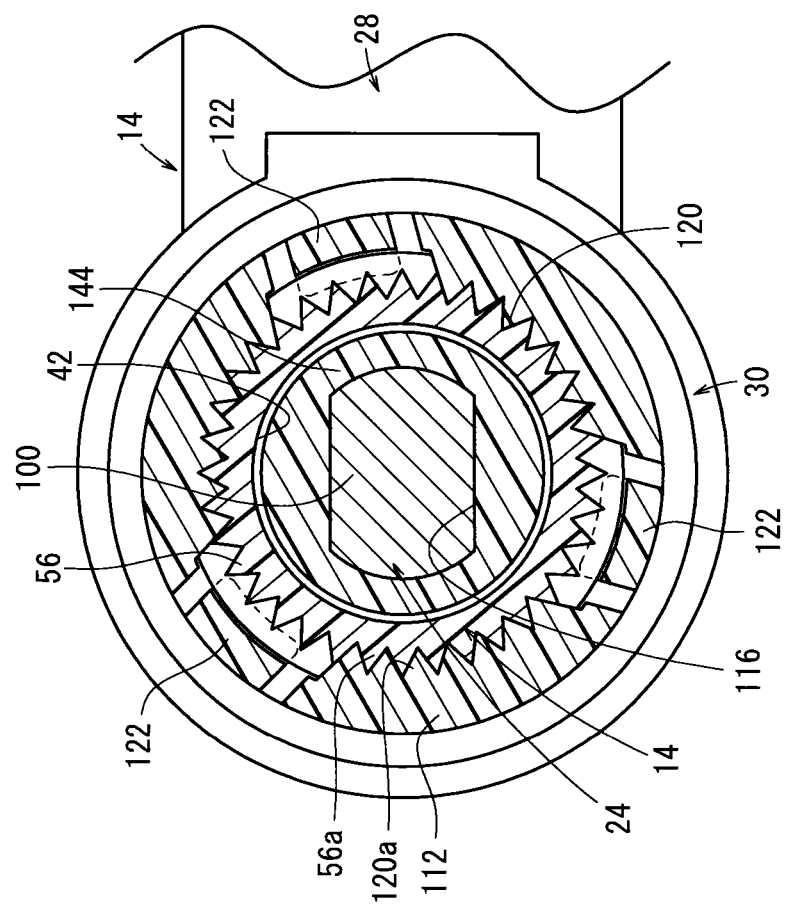
FIG. 7 is a cross sectional view taken along line VII-VII of FIG. 2.

Further, on an upper part of the third tubular section 36, a first meshing section 56 is provided, having a plurality of teeth formed along the outer circumferential surface thereof (see FIG. 7). The teeth, which are triangular in cross section, are formed continuously and in radial convex/concave shapes on the first meshing section 56, the teeth being in meshed engagement with a later-described handle 22.

Moreover, downwardly from the first meshing section 56, there are provided a first projection 58, which projects radially outward gradually in a downward direction (in the direction of the arrow A) with respect to the outer circumferential surface of the third tubular section 36, and a second projection 60, which is triangular in cross section and is formed downwardly with respect to the first projection 58. The first and second projections 58, 60 are formed in annular shapes along the outer circumferential surface of the third tubular section 36.

The first connecting member 30 extends a predetermined length downwardly (in the direction of the arrow A), while being distanced by a predetermined interval in a radial outward direction with respect to the second and third tubular sections 34, 36 constituting the main body portion 26. Additionally, in the vicinity of a lower end of the first connecting member 30, an o-ring is installed thereon via an annular groove formed on the outer circumferential surface, and an engagement groove 64 for engagement with the second body 18 is formed slightly upward (in the direction of the arrow B) with respect to the annular groove.

On the other hand, the third through hole 42 of the third tubular section 36 opens upwardly (in the direction of the arrow B), and a nut 66 is engaged and fixed therein adjacent to a border location with the second through hole 40, and together therewith, a portion of the later-described handle 22 is inserted into an upper part of the third through hole 42. Additionally, the needle valve 24 of the valve mechanism 20 is screw-engaged with the nut 66.

The connector 28 extends in a horizontal direction perpendicularly with respect to the main body portion 26, and the first port 12 opens therein in a direction away from the main body portion 26. More specifically, the connector 28 is formed to project a predetermined length laterally with respect to the main body portion 26. Stated otherwise, in the first body 14, the main body portion 26 and the connector 28 are formed substantially with a T-shape in cross section, the connector 28 extending in a direction away from the main body portion 26.

The first port 12 is formed on an open end side of the connector 28, a first connecting hole 68, which is reduced in diameter from the first port 12, is formed on a side of the main body portion 26 adjacent to the first port 12, and a second connecting hole 70, which is reduced in diameter from the first connecting hole 68, is formed adjacent to the first connecting hole 68 further toward the side of the main body portion 26. In addition, the second connecting hole 70 communicates with a fluid passage 72, which is provided between the outer circumferential side of the main body portion 26 and the first connecting member 30. A coupling mechanism 75, through which a fluid tube (tube) 74 for supplying a pressure fluid is connected to the connector 28, is provided in the first port 12.

The coupling mechanism 75 includes a chuck 76 that engages with the fluid tube 74 inserted in the first port 12, a guide 78 engaged with the inner circumferential surface of the first port 12, a release bush 80 displaceable along the guide 78, which releases an engaged state of the fluid tube 74 by the chuck 76, and a packing 82 for abutting against the first port 12 and the fluid tube 74 thereby to maintain airtightness.

The chuck 76, for example, is formed with a substantially cylindrical shape by pressing a thin plate material, with a claw member 84, which is inclined in a radial inward direction, being formed on one end thereof, and an engaging piece 86, which is bent radially outward, being formed on the other end thereof.

The guide 78, similar to the chuck 76, is formed with a substantially cylindrical shape by pressing a thin plate material, and is disposed so as to abut against the inner circumferential surface of the first port 12.

The release bush 80 is formed in a cylindrical shape, for example, from a resin material, one end side thereof being inserted on an inner circumferential side of the guide 78 and the chuck 76 in the interior of the first port 12. On the one end thereof, a tapered shape is formed, which projects radially outward and then gradually reduces in diameter toward the distal end side, facing toward the claw member 84 of the chuck 76.

The packing 82, for example, is formed with a T-shape in cross section from an elastic material such as rubber or the like, which is arranged in the interior of the first port 12 in abutment with a border location thereof with the first connecting hole 68. The packing 82 is formed in a ring shape, and includes a bulging part 92 formed on an outer circumferential surface thereof which abuts against the inner circumferential surface of the first port 12, and a seal member 94 that projects from the inner circumferential surface thereof in sliding contact with the outer circumferential surface of the fluid tube 74.

The valve mechanism 20 includes the needle valve 24, which is inserted and displaced in the axial direction (the direction of arrows A and B) through the interior of the main body portion 26 that constitutes the first body 14. The needle valve 24 is constituted from a shaft-like body, having a predetermined length along the axial direction (in the direction of arrows A and B). In more detail, the needle valve 24 is inserted through the second through hole 40 of the second tubular section 34 constituting the main body portion 26, the needle valve 24 being guided along the axial direction by sliding contact against the inner circumferential surface of the second through hole 40. More specifically, the second tubular section 34 functions as a guide member for guiding the needle valve 24 in the axial direction.

Further, the needle valve 24 includes a control section 96 formed on a lower end thereof and which is capable of controlling the flow rate of a fluid, a seating section 98 connected to an upper part of the control section 96 and which is capable of being seated on the seat 54 of the first body 14, and a shaft 100 formed on an upper part of the seating section 98 and which extends to the upper end side of the needle valve 24.

The control section 96 includes a first control surface 102 disposed at a forwardmost distal end and which is gradually reduced in diameter toward the distal end thereof and is inserted through the first through hole 38 of the first tubular section 32, and a second control surface 104 formed upwardly of the first control surface 102. The inclination angle of the first control surface 102 with respect to the axis of the needle valve 24 is larger than that of the second control surface 104 with respect to the axis of the needle valve 24. More specifically, the first control surface 102 is formed in a more tapered shape in comparison with the second control surface 104.

The seating section 98 is formed with a circular shape in cross section, is expanded in diameter radially outward with respect to the control section 96, and is inserted through the second through hole 40 of the first body 14. In addition, an o-ring 106 is mounted via an annular groove on an outer circumferential surface of the seating section 98, the o-ring 106 abutting against the inner circumferential surface of the second through hole 40. The o-ring 106 is installed at a position upwardly from the communication holes 50a, 50b (in the direction of the arrow B) when the lower surface of the seating section 98 is seated on the seat 54.

Figure 6:
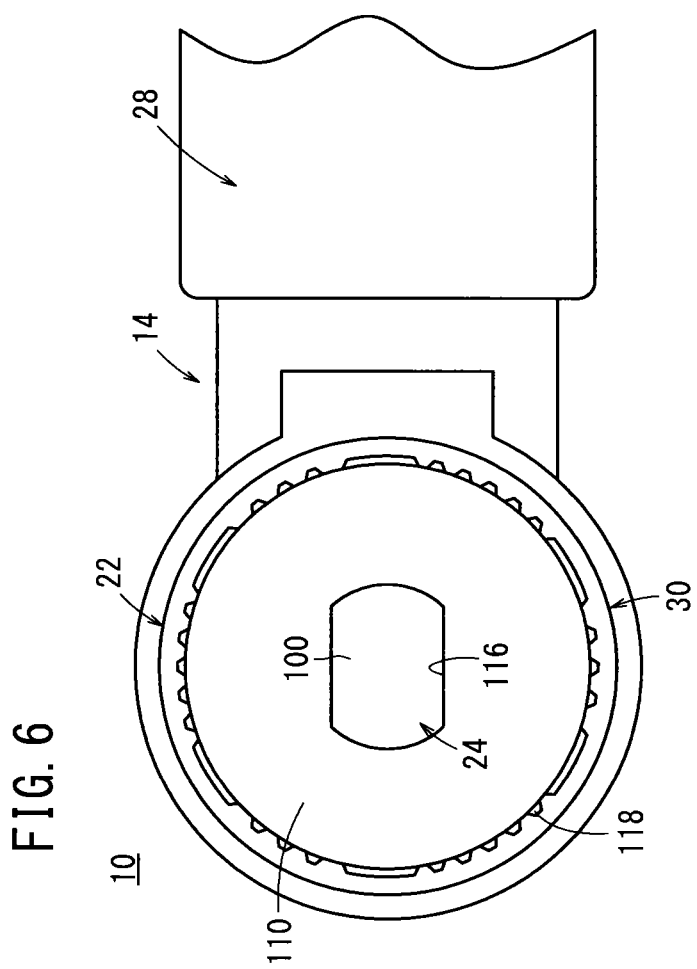
FIG. 6 is a plan view with partial omission of the flow control device of FIG. 1.

The shaft 100 is formed with a substantially rectangular shape in cross section having two arcuate surfaces (see FIG. 3 and FIG. 6), and is formed with a predetermined length along the axial direction while being inserted through the second and third through holes 40, 42. Threads 108 are engraved on the outer circumferential surface of the shaft 100. The threads 108 are screw-engaged with the nut 66 disposed in the interior of the main body portion 26, and the handle 22 is connected to an upper end of the shaft 100. Owing thereto, by rotation of the handle 22, and consequent rotation of the needle valve 24 including the shaft 100, the needle valve 24 is advanced and retracted along the axial direction of the main body portion 26.

Figure 3:
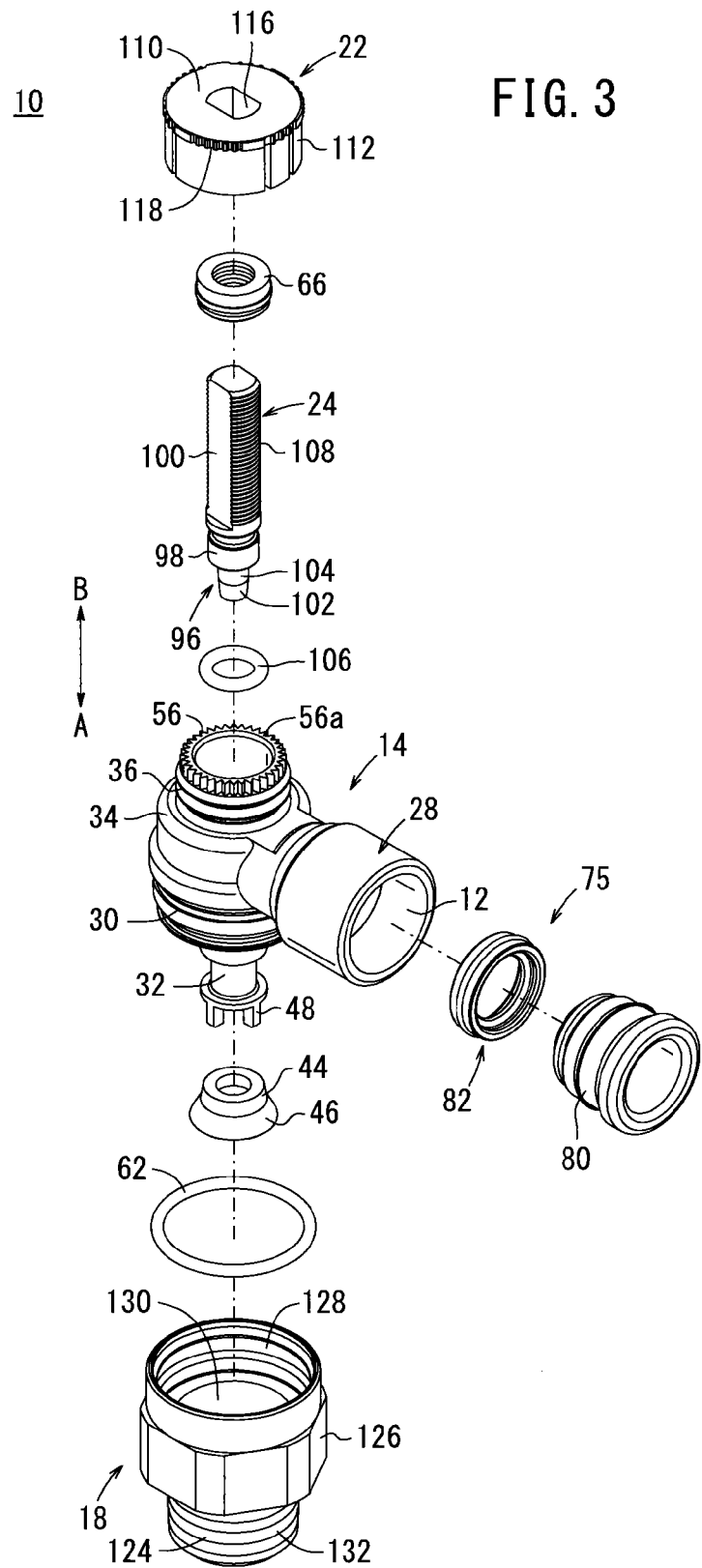
FIG. 3 is an exploded perspective view of the flow control device of FIG. 1.

As shown in FIGS. 2, 3 and 5, the handle 22 is formed in a bottomed cylindrical shape having a disk-shaped base portion 110 on an upper part thereof, an outer wall portion 112 extending downwardly from an outer edge of the base portion 110, and an annular inner wall portion 114 extending downwardly from a central region of the base portion 110. A shaft hole 116 in which the shaft 100 of the needle valve 24 is inserted is formed on an inner circumferential side of the inner wall portion 114.

In addition, the handle 22 is installed from an upper side of the main body portion 26 constituting the first body 14, with an end of the shaft 100 of the needle valve 24 being inserted into the shaft hole 116, and together therewith, the outer wall portion 112 of the handle 22 is mounted on an outer circumferential side of the third tubular section 36, whereas the inner wall portion 114 is mounted on the inner circumferential side of the third tubular section 36. At this time, the handle 22 is disposed displaceably along the axial direction (the direction of arrows A and B), and since the inner wall portion 114 is arranged between the third tubular section 36 and the needle valve 24, the handle 22 is guided along the third tubular section 36 and the needle valve 24.

On the outer circumferential surface of the base portion 110, a gripping member 118 is provided, which is made up from a plurality of convex protrusions that project in a radial outward direction. The gripping member 118 provides a slip-prevention function when a non-illustrated operator grips and rotates the handle 22.

Further, second meshing sections 120 are formed on a lower surface side of the base portion 110, projecting in a radial inward direction from the inner circumferential surface of the outer wall portion 112 and having a plurality of teeth (see FIG. 7). The plural teeth of the second meshing sections 120, which are triangular in cross section, are formed in radial convex/concave shapes, the teeth being held in meshing engagement with the first meshing section 56 formed on the upper part of the first body 14, for thereby regulating rotational displacement of the handle 22. More specifically, the first and second meshing sections 56, 120 function as a rotation regulating means for regulating rotational movement of the handle 22 with respect to the first body 14.

The second meshing sections 120 are disposed in a divided fashion at equal angular intervals mutually along the circumferential direction of the handle 22.

Hooks 122, which are bent perpendicularly in a radial inward direction, are provided on the lower end of the outer wall portion 112. The hooks 122 are provided in a plurality (for example at three locations) at equal angular intervals along the circumferential direction of the handle 22. Stated otherwise, the plural hooks 122 are arranged respectively at positions between the second meshing sections 120.

The second body 18 is formed in a tubular shape, having an attachment 124 on a lower end and which is engraved with threads 132 on the outer circumferential surface thereof, a tightening section 126, which is hexagonal in cross section, formed on an upper part of the attachment 124, a second connecting member 128 formed on an upper end adjacent to the tightening section 126 and which is connected to the first connecting member 30 of the first body 14, and an insertion hole 130 that penetrates internally therethrough along the axial direction of the second body 18.

The attachment 124 is connected, for example, to a non-illustrated fluid pressure apparatus S through the threads 132 provided on the outer circumferential surface thereof. The second port 16 is formed with a substantially constant diameter in the interior of the attachment 124. The second port 16 is constituted as part of the insertion hole 130. In addition, the fins 48 of the first tubular section 32 that constitute the first body 14 are inserted into the second port 16, and by sliding contact of the fins 48 along the inner circumferential surface thereof, the first body 14 is positioned coaxially with respect to the second body 18 having the second port 16 therein.

Further, the insertion hole 130 is expanded in diameter in a radial outward direction on an upper side (in the direction of the arrow B) of the second port 16, and the check valve 44, which is installed on the first body 14, comes into abutment with the inner circumferential surface of the insertion hole 130.

The tightening section 126 is used, for example, when the flow control device 10 is connected to another fluid pressure device S or the like using a non-illustrated tool. In addition, the insertion hole 130, which is formed in the interior of the connector 28, communicates with the second port 16, and extends upwardly while expanding gradually outward in diameter.

The inner circumferential surface of the second connecting member 128 is expanded in diameter maximally in a radial outward direction, and a projection 134, which projects radially inward, is formed with an annular shape on the inner circumferential surface. Further, the inner diameter of the second connecting member 128 is set to be substantially the same as the outer diameter of the first connecting member 30. Additionally, when the second connecting member 128 is installed to cover the outer circumferential side of the first connecting member 30 of the first body 14, the projection 134 is inserted and latched in the engagement groove 64, and the inner circumferential surface of the second connecting member 128 abuts against the outer circumferential surface of the first connecting member 30.

Consequently, the first body 14 including the first connecting member 30 is connected with respect to the second body 18 including the second connecting member 128, and since relative displacement therebetween in the axial direction is regulated, and the first connecting member 30 is fitted together with the second connecting member 128, the main body portion 26 of the first body 14 is properly positioned coaxially with the second body 18.

Further, although relative displacement of the mutually connected first and second bodies 14, 18 is regulated in the axial direction (the direction of arrows A and B), the first and second bodies 14, 18 are connected together while enabling rotation thereof about the axis of the first and second bodies 14, 18 through engagement between the projection 134 and the engagement groove 64.

Figure 4:
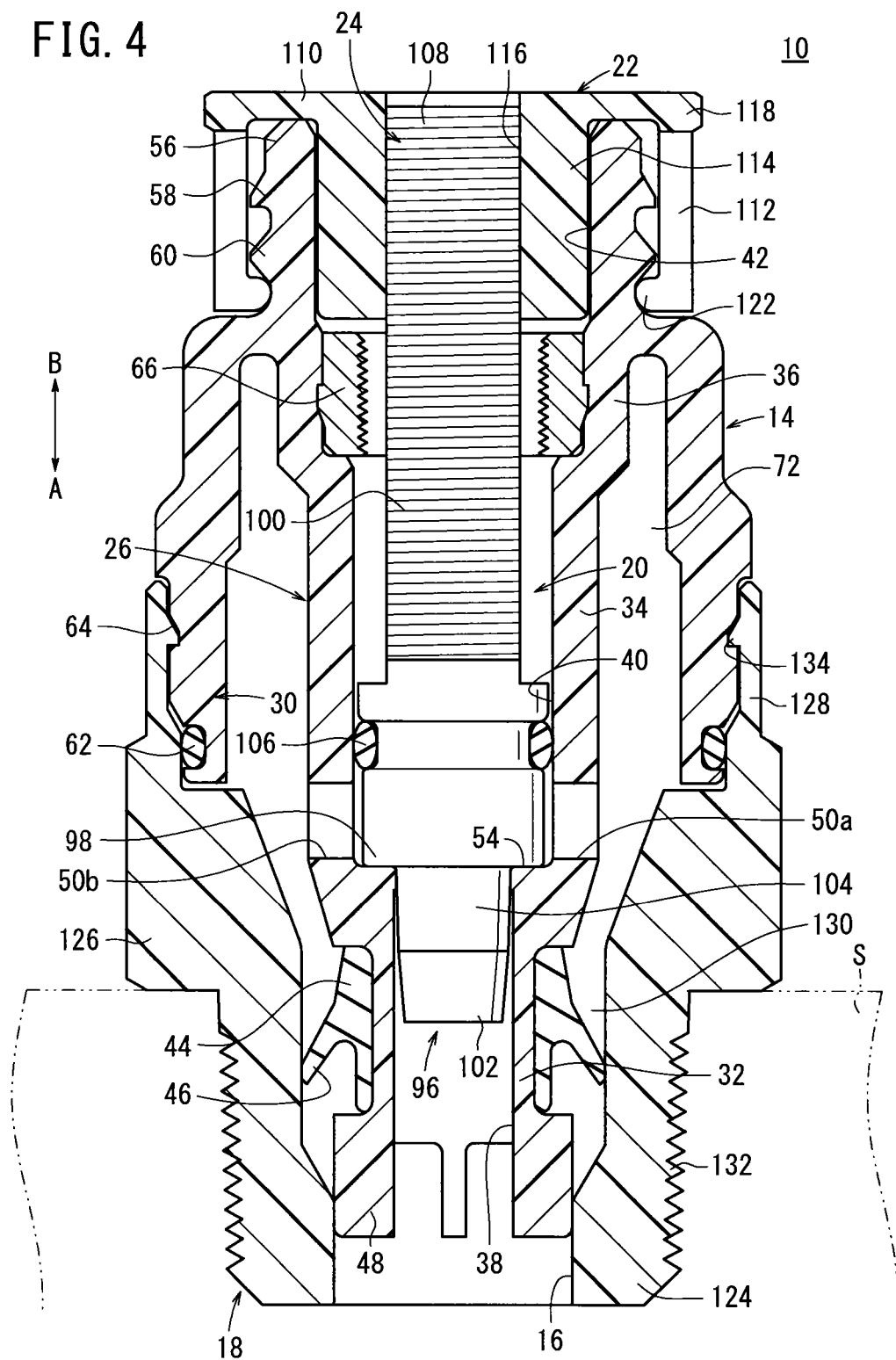
FIG. 4 is a cross sectional view taken along line IV-IV of FIG. 2.

The flow control device 10 according to the first embodiment of the present invention is constructed basically as described above. Next, operations and effects of the flow control device 10 will be explained. As shown in FIGS. 1, 2 and 4, a completely closed condition, in which the needle valve 24 constituting the valve mechanism 20 is lowered under a rotary action of the handle 22, so that the seating section 98 of the needle valve 24 is seated on the seat 54, thereby blocking communication between the first port 12 and the second port 16, and in addition, a rotation-regulated state, in which the handle 22 is moved downwardly so that the first meshing section 56 and the second meshing sections 120 are placed in meshing engagement, shall be described as an initial condition.

In the initial condition, for example, by supplying a pressure fluid to the second port 16 of the second body 18 from a pressure fluid device S or the like, the flow of the pressure fluid is rectified by the fins 48 of the first body 14, whereupon the pressure fluid flows upwardly through the first through hole 38 of the first tubular section 32. In this case, the check valve 44 is disposed between the first body 14 and the second body 18, such that the flange portion 46 thereof opens downwardly. Owing thereto, the pressure fluid is prevented from flowing downstream and passing between the first body 14 and the second body 18.

Figure 8:
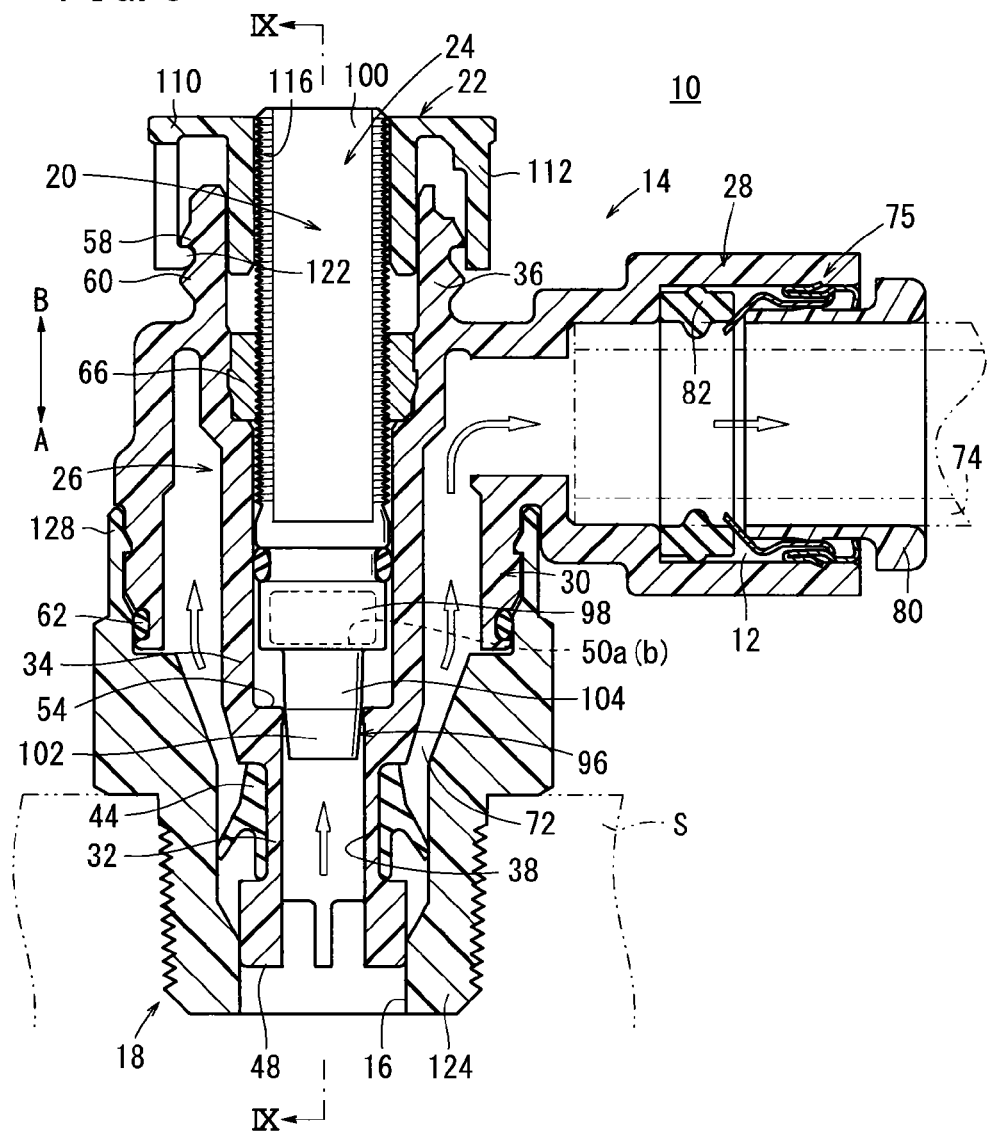
FIG. 8 is an overall cross sectional view showing a valve open state in which a handle is moved upwardly and a needle valve is separated away from a seat in the flow control device of FIG. 1.
Figure 9:
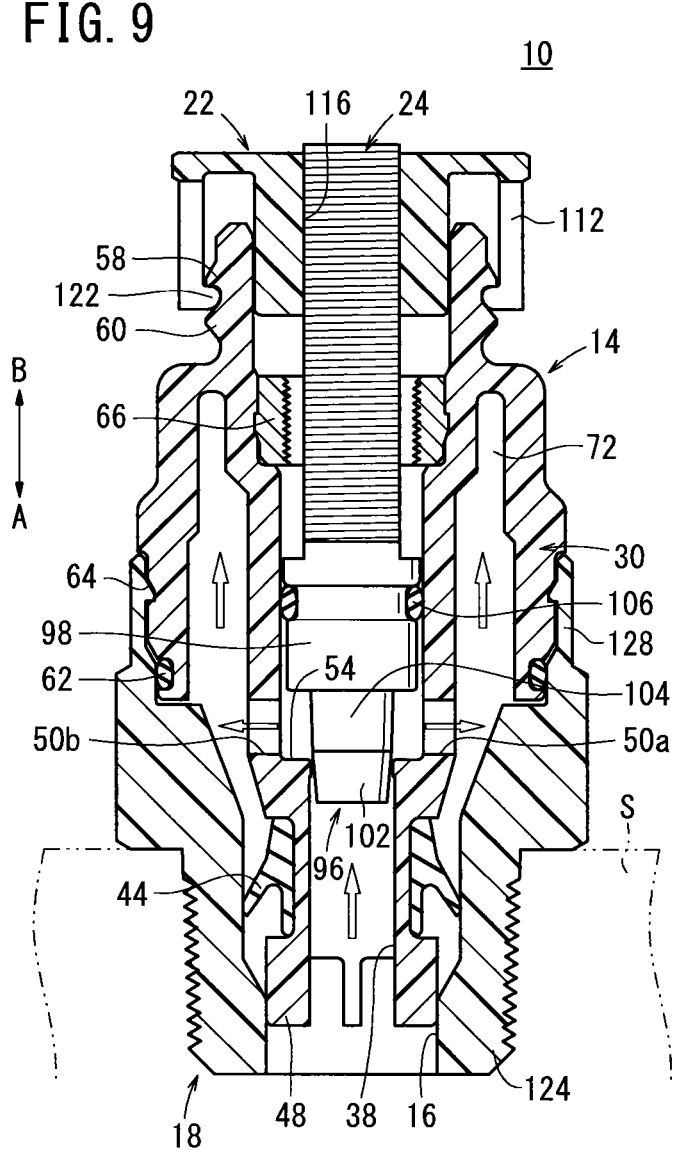
FIG. 9 is a cross sectional view taken along line IX-IX of FIG. 8.

Then, a non-illustrated operator moves the handle 22 upwardly (in the direction of the arrow B) along the axial direction, thereby releasing the condition in which rotational displacement of the needle valve 24 is regulated (see FIGS. 8 and 9). At this time, the hooks 122 of the handle 22 are moved from the state in which the hooks 122 are retained downwardly of the second projection 60, to a location between the second projection 60 and the first projection 58, whereupon, by engagement thereof with the first projection 58, the handle 22 is prevented from being pulled off from the first body 14.

In greater detail, by movement of the handle 22 upwardly (in the direction of the arrow B) along the shaft 100 of the needle valve 24, the second meshing sections 120 provided on the inner circumferential side of the handle 22 are separated from the first meshing section 56 provided on the upper end of the first body 14, and therefore, the rotation-regulated state of the handle 22 is released.

Then, the handle 22 is gripped and rotated in a predetermined direction, whereby the needle valve 24 is displaced upwardly (in the direction of the arrow B) while being rotated in engagement with the nut 66. At this time, the shaft 100 of the needle valve 24 projects gradually in an upward direction along the shaft hole 116 of the handle 22, and the needle valve 24 is displaced upwardly while being guided by the second through hole 40 of the second tubular section 34 (see FIGS. 8 and 9).

Consequently, the seating section 98 of the needle valve 24 separates gradually away from the state of abutment with the seat 54, thereby gradually enlarging the gap between the first through hole 38 and the second control surface 104 of the control section 96. In addition, the pressure fluid, which has flowed through the gap to the interior of the second through hole 40, flows in a radial outward direction through the pair of communication holes 50a, 50b and is supplied to the fluid passage 72. At this time, the flow rate of the pressure fluid is controlled in proportion to the size of the gap between the inner circumferential surface of the first through hole 38 and the control section 96 of the needle valve 24.

Finally, after the pressure fluid has moved upward along the fluid passage 72 and flows to the connector 28 of the first body 14, the pressure fluid flows at a desired flow rate to another fluid pressure device through the fluid tube 74 that is coupled to the connector 28 through the coupling mechanism 75. In addition, by the non-illustrated operator moving the handle 22 downwardly in the axial direction (the direction of the arrow A), thereby bringing the first meshing section 56 and the second meshing sections 120 into meshed engagement with each other, further rotation of the handle 22 is regulated, resulting in a condition in which rotational displacement of the needle valve 24 is restricted.

More specifically, the displacement amount in the axial direction (the direction of the arrows A and B) of the needle valve 24 is proportional to the flow rate of the pressure fluid, which flows through the communication holes 50a, 50b from the second port 16 to the side of the first port 12. Stated otherwise, the flow rate of the pressure fluid is controlled by controlling the displacement amount of the needle valve 24.

By further rotating the handle 22 and moving the first control surface 102 of the needle valve 24 to a position confronting the seat 54, the flow rate of the pressure fluid, which flows between the first through hole 38 and the first control surface 102, the inclination angle of which has been set largely with respect to the second control surface 104, can be further increased.

Additionally, after the flow rate of the pressure fluid, which is controlled through the flow control device 10, has been confirmed to have arrived at a desired flow rate by a non-illustrated flow rate meter or the like, rotational movement of the handle 22 is regulated by the operator pressing the handle 22 downwardly to bring the first meshing section 56 and the second meshing sections 120 into meshed engagement with each other. More specifically, a rotation-locked condition of the handle 22 is established.

Owing thereto, changes in the flow rate of the pressure fluid caused by operating the handle 22 in error and by mistaken rotation of the needle valve 24 can reliably be prevented.

On the other hand, in the case that the flow rate of the pressure fluid discharged through the tube from the first port 12 is to be reduced, then in a condition in which the pressure fluid is flowing from the aforementioned second port 16 to the first port 12, after the non-illustrated operator has gripped the handle 22 and moved the handle 22 upwardly again, the handle 22 is turned in a direction opposite to the aforementioned direction, whereupon the needle valve 24 is moved downwardly (in the direction of the arrow A) along the main body portion 26 of the first body 14. More specifically, the needle valve 24 is displaced downwardly while being guided by the second through hole 40 of the second tubular section 34.

Consequently, the control section 96 of the needle valve 24 is displaced downwardly in the first through hole 38, whereby the gap between the control section 96 and the first through hole 38 becomes gradually smaller, and therefore, the flow rate of the pressure fluid that flows downstream through the gap is reduced. In addition, by further rotating the handle 22 and bringing the seating section 98 on the needle valve 24 into abutment against the seat 54, further downward movement of the needle valve 24 is regulated, and the initial condition, i.e., the completely closed state, is restored, whereby communication between the first port 12 and the second port 16 through the communication holes 50a, 50b is blocked.

In the foregoing manner, according to the first embodiment, the first body 14 constituting the flow control device 10 is formed from a resin material, and is made up from the connector 28, to which the fluid tube 74 is connected through the coupling mechanism 75, and the main body portion 26, which is joined to the connector 28. Together therewith, on the main body portion 26, there are provided the first tubular section 32 on which the check valve 44 is mounted, and the second tubular section 34, which displaceably supports the needle valve 24 that constitutes the valve mechanism 20, and which includes the seat 54 for seating of the needle valve 24 thereon.

In this manner, by forming the main body portion 26 including the first and second tubular sections 32, 34 and the connector 28 in an integral manner, compared to the case of the conventional technique constituted from respective separate elements, the number of component parts and the number of assembly steps can be reduced. As a result, ease of assembly of the flow control device 10 can be further improved.

Further, because the first body 14 is formed from a resin material, compared to a conventional flow control device constituted from multiple different members and for which metal materials are used, since the components made from metal materials can be reduced in number, the flow control device 10 including the first body 14 thereof can be made lighter in weight.

Furthermore, by providing the seat 54 on which the needle valve 24 is seated integrally with the first body 14, an assembly step which would be required if the seat 54 were formed as a separate element is rendered unnecessary, and assembly can be accomplished merely by assembling the first body 14 and the second body 18 vertically along the axial direction. As a result, ease of assembly of the flow control device 10 can be enhanced.

Moreover, because the seat 54 is provided integrally with the first body 14, compared to a case of providing the seat 54 as a separate element, the height of the flow control device 10 in the axial direction (the direction of arrows A and B) can be suppressed, and thus, the flow control device 10 can be made smaller in scale.

Still further, in the first body 14, the pair of communication holes 50a, 50b disposed in the main body portion 26 are formed so as to be positioned further downward than the lower end of the first connecting member 30, which is formed on the outer circumferential side of the main body portion 26. Therefore, for example, in the case that the communication holes 50a, 50b are formed by a mold or a machining jig or the like, the communication holes 50a, 50b can be formed horizontally and perpendicular to the axis of the main body portion 26 without interfering with the first connecting member 30.

Further, when the first body 14 and the second body 18 are assembled, the first body 14 and the second body 18 are fitted together mutually by inserting the first tubular section 32 of the first body 14 through the second port 16 of the second body 18, while simultaneously, the first body 14 and the second body 18 are fitted together mutually by interconnecting the first connecting member 30 of the first body 14 and the second connecting member 128 of the second body 18. Owing thereto, by fitting together the first body 14 and the second body 18 at two locations, which are separated a given distance along the axial direction, the first body 14 and the second body 18 can be arranged coaxially easily and reliably.

As a result, the check valve 44 mounted on the first body 14 can abut reliably against the second body 18, and the o-ring 62 mounted on the first connecting member 30 also can abut reliably with respect to the second connecting member 128, and therefore, airtightness between the first body 14 and the second body 18 can be enhanced. Further, after the first body 14 and the second body 18 have been assembled together, because complex adjustments are unnecessary for adjusting the first body 14 and the second body 18 to be coaxial, the number of assembly steps can be significantly reduced.

Still further, a switching function is provided, in which the handle 22 that displaces the valve mechanism 20 is gripped and moved upwardly by the operator, whereby the engaged state of the first meshing section 56 and the second meshing sections 120 is released and the needle valve 24 is placed in a rotation-enabled state, whereas by lowering the handle 22 and causing the first meshing section 56 and the second meshing sections 120 to come into engagement, rotational movement of the needle valve 24 is regulated. Therefore, the displacement-regulated state of the needle valve 24 by the handle 22 can easily and reliably be switched.

Figure 10:
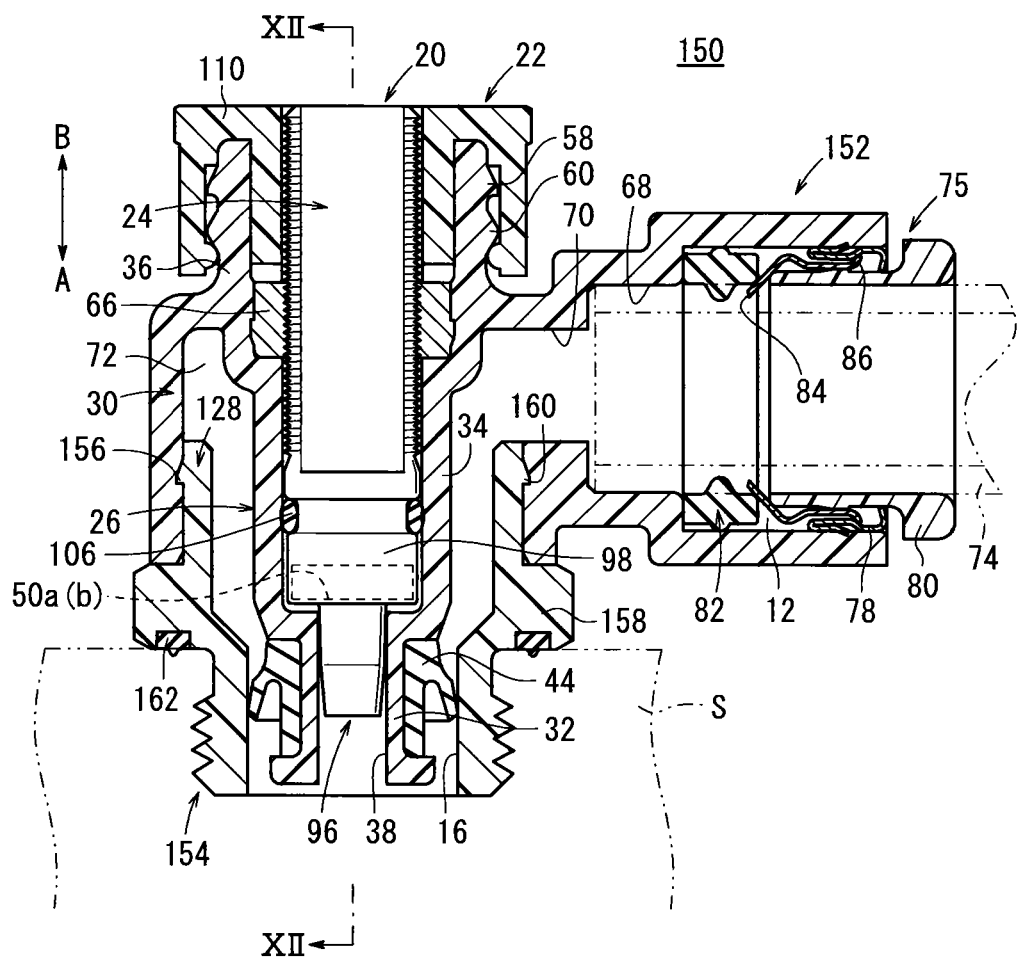
FIG. 10 is an overall cross sectional view of a flow control device according to a second embodiment of the present invention.
Figure 11:
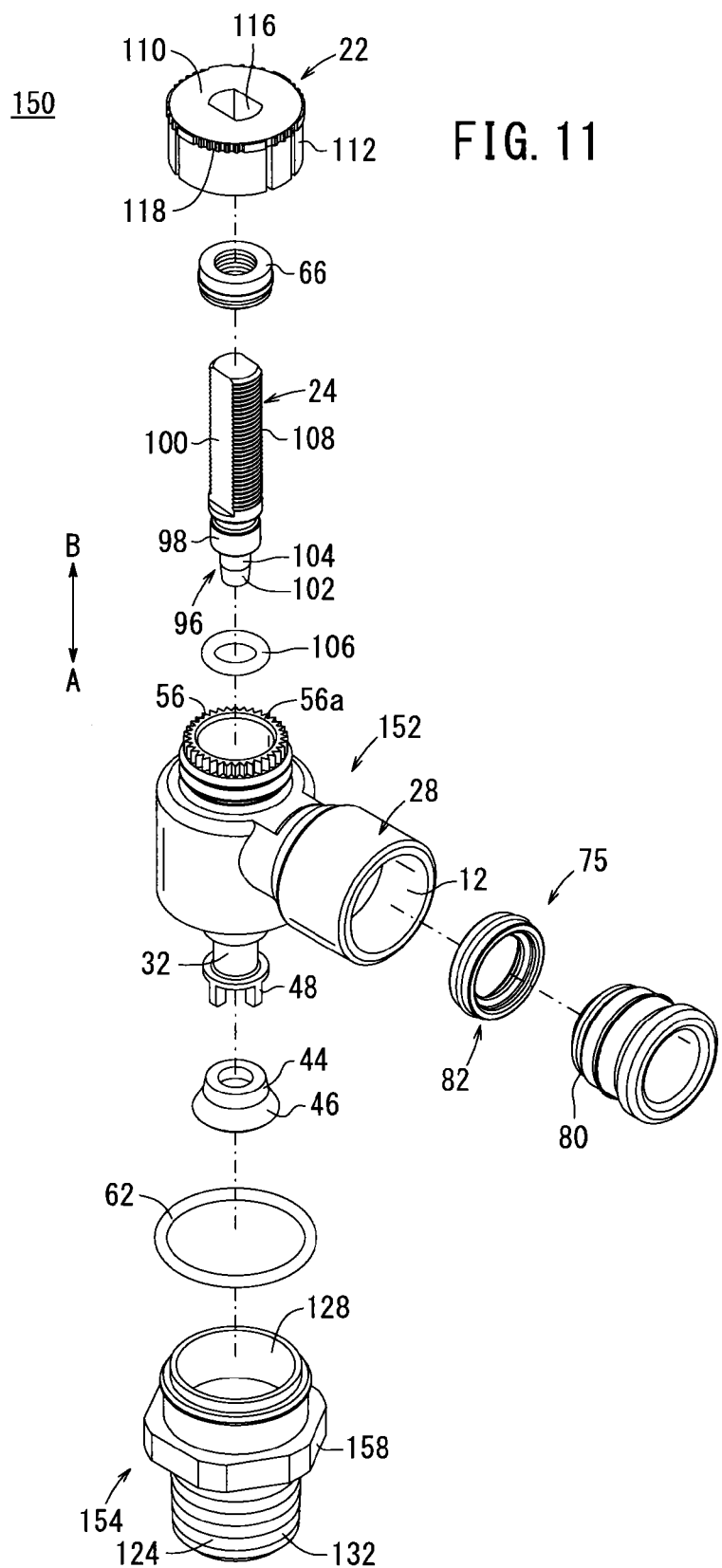
FIG. 11 is an exploded perspective view of the flow control device of FIG. 10.
Figure 12:
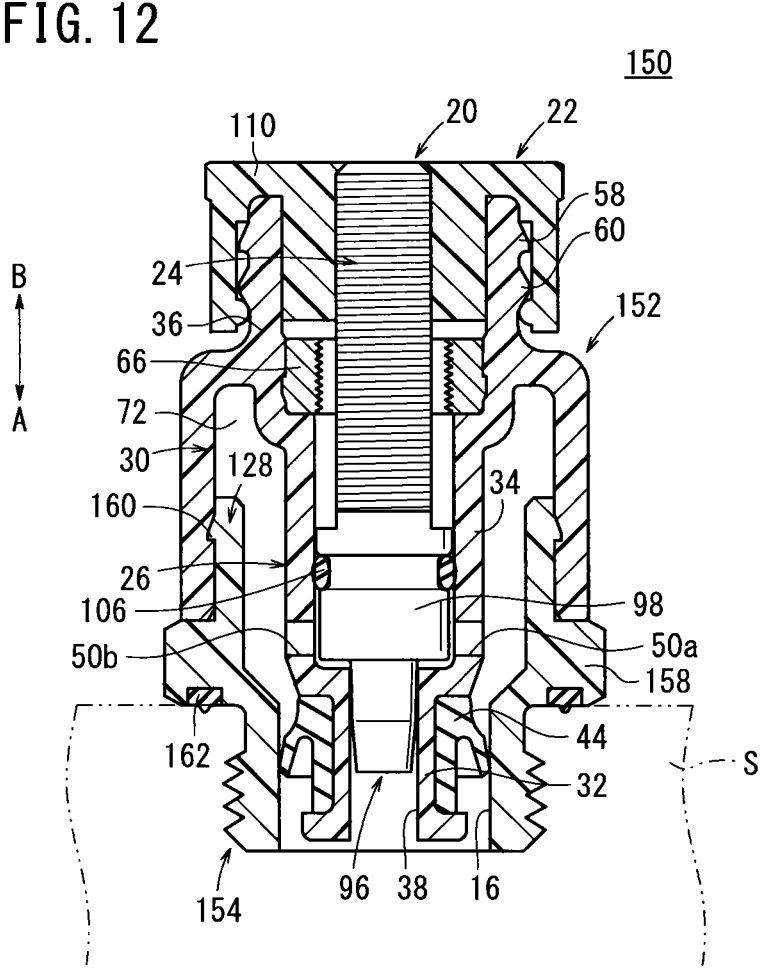
FIG. 12 is a cross sectional view taken along line XII-XII of FIG. 10.

Next, a flow control device 150 according to a second embodiment is shown in FIGS. 10 to 12. Structural elements thereof, which are the same as those of the flow control device 10 according to the above-described first embodiment, are designated with the same reference numerals and detailed explanations of such features are omitted.

The flow control device 150 according to the second embodiment differs from the flow control device 10 according to the first embodiment, in that the second body 154 is fitted and connected to a lower end of the first body 152 in the interior thereof.

As shown in FIGS. 10 to 12, the flow control device 150 comprises the first body 152 having the first port 12 to which a pressure fluid is supplied, and the second body 154 having the second port 16 from which the pressure fluid is discharged and which is assembled with respect to the first body 152. An engagement groove 156, which is recessed in a radial outward direction, is formed in an annular shape on an inner circumferential surface of the first connecting member 30 that makes up part of the first body 152.

On the other hand, a tightening section 158 is formed substantially centrally along the axial direction (the direction of arrows A and B) on the second body 154, and an annular projection 160, which projects in a radial outward direction, is formed on the second connecting member 128 above the tightening section 158. In addition, when the first body 152 is connected with the second body 154, the second connecting member 128 is inserted into the inner circumferential side of the first connecting member 30, whereby the projection 160 is inserted into and engages with the engagement groove 156, and the outer circumferential surface of the second connecting member 128 and the inner circumferential surface of the first connecting member 30 are placed in abutment.

Consequently, the second body 154 including the second connecting member 128 is connected with respect to the first body 152 including the first connecting member 30, and the first connecting member 30 and the second connecting member 128 are fitted together such that relative displacement therebetween in the axial direction is regulated, and therefore, the main body portion 26 of the first body 152 is positioned coaxially with the second body 154.

Further, although relative displacement of the mutually connected first and second bodies 152, 154 is regulated in the axial direction (the direction of arrows A and B), the first and second bodies 152, 154 are connected together while enabling rotation in a circumferential direction about the axis of the first and second bodies 152, 154 through engagement between the projection 160 and the engagement groove 156.

Furthermore, on the tightening section 158 of the second body 154, a seal member 162 is mounted via an annular groove on a lower surface side thereof, and, for example, when the attachment 124 of the second body 154 is connected to a fluid pressure device S or the like, the seal member 162 abuts against an end surface of the fluid pressure device S or the like. Owing thereto, leakage of pressure fluid between the second body 154 and the fluid pressure device S or the like is prevented.

The flow control device according to the present invention is not limited to the aforementioned embodiments. It is a matter of course that various alternative structures could be adopted without deviating from the essence and gist of the present invention.

The invention claimed is:

1. A flow control device capable of controlling the flow rate of a fluid that flows between a pair of a first port and a second port by displacement of a rod having a valve member thereon in an axial direction, comprising:
   a first body including a coupling having the first port and to which a tube is connected for supplying or discharging the fluid, a guide member for guiding the rod along the axial direction, and a seat on which the valve member can be seated; and
   a second body disposed on a lower part of the first body and having the second port to which the fluid is supplied or from which the fluid is discharged,
   wherein a holder is formed on an outer circumferential surface of the first body, the holder retains a check valve such that each of the check valve and a portion of the holder abuts against an inner circumferential surface of the second body, the portion of the holder abutting the inner circumferential surface of the second body is positioned below the check valve in a direction of the second port,
   wherein a fluid passage that communicates with the first port and through which the fluid flows is formed between the first body and the second body,
   wherein a first connecting member, which is disposed on an outer peripheral end of the first body, is connected to a second connecting member disposed on an end of the second body, and
   wherein the first connecting member and the second connecting member are positioned adjacent each other in a radial direction, which is substantially perpendicular to the axial direction.

2. The flow control device according to claim 1, wherein on the first body, the guide member, the seat, and the holder are disposed coaxially along the axial direction, and the coupling is formed with a substantially L-shape in cross section such that the coupling is disposed perpendicularly to said axial direction.

3. The flow control device according to claim 2, wherein communication holes through which the fluid flows are formed in the first body downward from a lower end of the first connecting member.

4. The flow control device according to claim 3, wherein the communication holes extend in a radial outward direction about an axis of the first body.

5. The flow control device according to claim 1, wherein the first body comprises positioning means, which is inserted through the interior of the second body and is fitted with respect to an inner circumferential surface or an outer circumferential surface of the second body.

6. The flow control device according to claim 5, wherein the positioning means comprises:

a first fitting member formed on a lower end of the first body and which is fitted with respect to the second port of the second body; and a second fitting member fitted to an inner circumferential surface of the second connecting member, wherein the second fitting member is the first connecting member.

7. The flow control device according to claim 5, wherein the positioning means comprises:

a first fitting member formed on a lower end of the first body and which is fitted with respect to the second port of the second body; and a second fitting member fitted to an outer circumferential surface of the second connecting member, wherein the second fitting member is the first connecting member.

8. The flow control device according to claim 1, wherein the first body comprises an operating element capable of rotating the rod, the operating element including means for regulating rotational movement of the rod.

9. The flow control device according to claim 8, wherein the operating element comprises means for switching between a state in which the rod is rotatable and a state in which rotation of the rod is regulated.

10. The flow control device according to claim 6, wherein the first fitting member is made up from a plurality of fins, which are separated from each other by equal distances in a circumferential direction, the fins being capable of rectifying the flow of the fluid that flows through the second port.

11. The flow control device according to claim 3, wherein the communication holes are formed in the first body and gradually inclined in a downward direction toward an outer circumferential side.

12. The flow control device according to claim 7, wherein the first fitting member is made up from a plurality of fins, which are separated from each other by equal distances in a circumferential direction, the fins being capable of rectifying the flow of the fluid that flows through the second port.

13. The flow control device according to claim 1, wherein an inner diameter of the second connecting member is substantially the same as an outer diameter of the first connecting member.

14. The flow control device according to claim 1, wherein the holder abuts against an inner circumferential surface of the second port of the second body.

* * * * *